United States Patent
Dewitt et al.

(10) Patent No.: US 9,880,755 B2
(45) Date of Patent: Jan. 30, 2018

(54) SYSTEM AND METHOD FOR COPY ON WRITE ON AN SSD

(71) Applicant: Western Digital Technologies, Inc., Irvine, CA (US)

(72) Inventors: Dylan Mark Dewitt, Rochester, MN (US); Adam Michael Espeseth, Rochester, MN (US); Colin Christopher McCambridge, Rochester, MN (US); David George Dreyer, Rochester, MN (US)

(73) Assignee: Western Digital Technologies, Inc., San, CA (US)

( * ) Notice: Subject to any disclaimer, the term of this patent is extended or adjusted under 35 U.S.C. 154(b) by 342 days.

(21) Appl. No.: 14/630,863

(22) Filed: Feb. 25, 2015

(65) Prior Publication Data
US 2016/0246521 A1    Aug. 25, 2016

(51) Int. Cl.
*G06F 12/02* (2006.01)
*G06F 3/06* (2006.01)
(Continued)

(52) U.S. Cl.
CPC ............ *G06F 3/0619* (2013.01); *G06F 3/061* (2013.01); *G06F 3/065* (2013.01); *G06F 3/0655* (2013.01);
(Continued)

(58) Field of Classification Search
CPC ............ G06F 13/4022; G06F 13/4282; G06F 2212/7201; G06F 3/0619; G06F 3/061; G06F 3/0667; G06F 12/0246
(Continued)

(56) References Cited

U.S. PATENT DOCUMENTS 4,742,450 A    5/1988  Duvall et al.
5,481,694 A *  1/1996  Chao ............... G06F 3/0601
                                                    711/112
(Continued)

FOREIGN PATENT DOCUMENTS

JP    2010-026940 A    2/2010
JP    2012-512482 A    5/2012
(Continued)

OTHER PUBLICATIONS

Japanese Office Action for Application No. 2016-033374; dated Jan. 31, 2017; 4 total pages.
(Continued)

*Primary Examiner* — Jared Rutz
*Assistant Examiner* — Jana Blust
(74) *Attorney, Agent, or Firm* — Patterson + Sheridan, LLP

(57) ABSTRACT

Techniques for improved copy on write functionality within an SSD are disclosed. In some embodiments, the techniques may be realized as a method for providing improved copy on write functionality within an SSD including providing, in memory of a device, an indirection data structure. The data structure may include a master entry for cloned data, the master entry having a reference to one or more indexes and a clone entry for the cloned data, the cloned entry having at least one of: a reference to a master index, a reference to a next index, and a value indicating an end of a data structure. The techniques may include traversing, using a computer processor, one or more copies of the cloned data using one or more of the references.

13 Claims, 6 Drawing Sheets

Example uses 4KB PLB entries and CChunk size multiple of 8
"Next Index" forms circular singly linked list of master and all clone C chunks

(51) Int. Cl.
*G06F 13/40* (2006.01)
*G06F 13/42* (2006.01)
(52) U.S. Cl.
CPC ........ *G06F 3/0688* (2013.01); *G06F 12/0246* (2013.01); *G06F 13/4022* (2013.01); *G06F 13/4282* (2013.01); *G06F 2212/7201* (2013.01)
(58) Field of Classification Search
USPC ......................................................... 711/103
See application file for complete search history.

(56) References Cited

U.S. PATENT DOCUMENTS

| | | | | |
|---|---|---|---|---|
| 5,574,905 | A * | 11/1996 | deCarmo | G11B 27/034 |
| 5,815,649 | A * | 9/1998 | Utter | G06F 11/2071 |
| | | | | 709/215 |
| 6,219,770 | B1 | 4/2001 | Landau | |
| 6,751,583 | B1 * | 6/2004 | Clarke | G06F 17/5022 |
| | | | | 703/17 |
| 6,779,095 | B2 * | 8/2004 | Selkirk | G06F 3/065 |
| | | | | 711/114 |
| 7,529,897 | B1 * | 5/2009 | Waldspurger | G06F 11/1438 |
| | | | | 711/161 |
| 7,941,692 | B2 | 5/2011 | Royer et al. | |
| 8,190,835 | B1 | 5/2012 | Yueh | |
| 8,447,943 | B2 | 5/2013 | Kawaguchi | |
| 8,850,145 | B1 * | 9/2014 | Haase | G06F 17/30 |
| | | | | 711/162 |
| 8,862,810 | B2 | 10/2014 | Lee et al. | |
| 9,251,066 | B2 * | 2/2016 | Colgrove | G06F 3/0608 |
| 2002/0078078 | A1 * | 6/2002 | Oksanen | G06F 12/023 |
| 2003/0018689 | A1 * | 1/2003 | Ramakrishnan | G06F 12/023 |
| | | | | 718/104 |
| 2003/0159007 | A1 * | 8/2003 | Sawdon | G06F 11/1435 |
| | | | | 711/154 |
| 2004/0040018 | A1 * | 2/2004 | Fleming | G06F 12/0269 |
| | | | | 717/162 |
| 2007/0130228 | A1 * | 6/2007 | Breau | G06F 11/1448 |
| 2007/0174369 | A1 * | 7/2007 | Detlefs | G06F 12/0269 |
| 2009/0063765 | A1 * | 3/2009 | Kottomtharayil | G06F 3/0619 |
| | | | | 711/112 |
| 2009/0292705 | A1 * | 11/2009 | McKenney | G06F 17/30356 |
| 2010/0023716 | A1 * | 1/2010 | Nemoto | G06F 11/1451 |
| | | | | 711/162 |
| 2010/0153620 | A1 | 6/2010 | McKean et al. | |
| 2011/0161298 | A1 | 6/2011 | Grobman et al. | |
| 2013/0042049 | A1 * | 2/2013 | Fiske | G06F 3/065 |
| | | | | 711/103 |
| 2013/0067139 | A1 | 3/2013 | Yamamoto et al. | |
| 2013/0086006 | A1 | 4/2013 | Colgrove et al. | |
| 2013/0086308 | A1 * | 4/2013 | Nakata | G06F 3/0689 |
| | | | | 711/103 |
| 2013/0097399 | A1 * | 4/2013 | Chhaunker | G06F 12/00 |
| | | | | 711/165 |
| 2013/0159647 | A1 * | 6/2013 | Kabano | G06F 17/30138 |
| | | | | 711/162 |
| 2013/0185532 | A1 * | 7/2013 | Flynn | G06F 3/061 |
| | | | | 711/162 |
| 2013/0227248 | A1 | 8/2013 | Mehta et al. | |
| 2014/0195749 | A1 * | 7/2014 | Colgrove | G06F 3/0619 |
| | | | | 711/159 |
| 2015/0067286 | A1 * | 3/2015 | Colgrove | G06F 3/0608 |
| | | | | 711/162 |
| 2015/0143065 | A1 * | 5/2015 | Lu | G06F 3/061 |
| | | | | 711/162 |

FOREIGN PATENT DOCUMENTS

| | | |
|---|---|---|
| JP | 2014-514622 A | 6/2014 |
| WO | WO-2013/095381 A1 | 6/2013 |
| WO | 2014/130035 A1 | 8/2014 |

OTHER PUBLICATIONS

Copy-On-Write Snapshot, HDS: Logical, Change-Based, Point-in-Time Replication—Hitachi Copy-on-Write Snapshot, www.hds.com/products/storage-software/copy-on-write-snapshot.html, printed Oct. 5, 2013, 1 page.
Microsoft, "Info: Copy on Write Page Protection for Windows NT, Windows 2000, or Windows XP", http://support.microsoft.com/kb/103858, printed Oct. 4, 2013, 2 pages.
Smith, et al., "Effects of Copy-On-Write Memory Management on the Response Time of UNIX *fork* operations", Computer Science Department, Columbia University, Computing Systems, 1(3):255-278, No Month Given, 1988, 12 pages.
Office action dated Jul. 26, 2016 for UK Application No. GB1601965.5.
Office action dated Mar. 15, 2017 for Korean Patent Application No. 10-2016-0022000.

* cited by examiner

Uncloned PLBs

| Phys Addr 0 | Phys Addr 1 | Phys Addr 2 | Phys Addr 3 | Phys Addr 4 | Phys Addr 5 | Phys Addr 6 | Phys Addr 7 |
|---|---|---|---|---|---|---|---|
| LBAs 0-7 | LBAs 8-15 | LBAs 16-23 | LBAs 24-31 | LBAs 32-39 | LBAs 40-47 | LBAs 48-55 | LBAs 56-63 |

Fig. 2

Example uses 4KB PLB entries and CChunk size multiple of 8
"Next Index" forms circular singly linked list of master and all clone C chunks

| NAND Address$_0$ | Clone Tracking = 1 |
| --- | --- |
| NAND Address$_1$ | Clone Tracking = 1 |
| NAND Address$_2$ | Clone Tracking = 1 |
| NAND Address$_3$ | Clone Tracking = 1 |
| NAND Address$_6$ | Clone Tracking = 1 |
| NAND Address$_7$ | Clone Tracking = 1 |
| Master Index | |
| Next Index | |

Fig. 6A

| NAND Address$_0$ | Clone Tracking = 1 |
| --- | --- |
| NAND Address$_1$ | Clone Tracking = 1 |
| NAND Address$_2$ | Clone Tracking = 1 |
| NAND Address$_3$ | Clone Tracking = 1 |
| NAND Address$_4$ | Clone Tracking = 1 |
| NAND Address$_5$ | Clone Tracking = 1 |
| Master Index | |
| Next Index | |

Fig. 6B

SYSTEM AND METHOD FOR COPY ON WRITE ON AN SSD

BACKGROUND

The Non-Volatile Memory express (NVMe) Specification is a specification for accessing solid-state devices (SSDs) and other target devices attached through a Peripheral Component Interconnect Express (PCIe) bus. The NVMe SSD PCIe host interface defines a concept of Namespaces, which are analogous to logical volumes supported by SAS RAID (Redundant Array of Independent Disks) adapters. Copy on write functionality in an SSD may be implemented using namespaces. Namespaces are typically implemented as an abstraction above the global Logical Block Address (LBA) space tracked in an SSD's indirection system.

LBA metadata only indicates one host LBA and it does not include a reference count. Including or appending a reference count in the metadata would incur additional writes to rewrite the data with new metadata, which is a poor solution. Without such reference counts in the LBA metadata, there is not a mechanism for determining whether additional clone copies exist (e.g., that additional LBA's point to the same data). Managing multiple clone copies of data on an SSD therefore faces particular challenges with respect to garbage collection. For example, when a host modifies the 'source' LBA after a copy operation it may produce garbage collection challenges. The source copy may be effectively the 'master' copy that was written before the copy operation was performed to duplicate the data to one or more additional host LBAs. When this master LBA is modified, a non-copy-aware garbage collection algorithm may free the physical data at the next opportunity, since a method does not exist to efficiently modify that data's metadata to indicate that more host LBAs point to that data.

SUMMARY OF THE DISCLOSURE

Techniques for improved copy on write functionality within an SSD are disclosed. In some embodiments, the techniques may be realized as a method for providing improved copy on write functionality within an SSD including providing, in memory of a PCIe device, an indirection data structure. The data structure may include a master entry for original or source copy of the cloned data, the master entry having a reference to a master index and a reference to a next index, a clone entry for the cloned data, the cloned entry having a reference to the master index and a reference to a next index. The techniques may include traversing, using a computer processor, one or more copies of the cloned data using one or more of the references.

In accordance with additional aspects of this exemplary embodiment, the host device may include at least one of: an enterprise server, a database server, a workstation, and a computer.

In accordance with additional aspects of this exemplary embodiment, the indirection data structure may include a plurality of physical addresses.

In accordance with further aspects of this exemplary embodiment, the indirection data structure may be part of a circularly linked list, wherein the master entry for cloned data comprises a reference to a master index and a reference to a next index.

In accordance with other aspects of this exemplary embodiment, the indirection data structure may be part of a circularly linked list, wherein the clone entry for the cloned data comprises a reference to the master index and a reference to a next index.

In accordance with additional aspects of this exemplary embodiment, the indirection data structure may be part of a single-ended linked list, wherein an entry in an index provides an indication that the index is a master index.

In accordance with further aspects of this exemplary embodiment, the references may include entries in a flat indirection table for logical block addressing.

In accordance with other aspects of this exemplary embodiment, the references may include entries in a tree data structure for logical block addressing.

In accordance with additional aspects of this exemplary embodiment, the improved copy on write functionality may include an improved namespace copy functionality.

In accordance with further aspects of this exemplary embodiment, the techniques may include setting an indicator for one or more packed logical blocks to indicate that the one or more packed logical blocks are cloned.

In accordance with other aspects of this exemplary embodiment, a master index of the master entry may point to the master entry.

In accordance with additional aspects of this exemplary embodiment, the master index of the cloned entry may point to the master entry.

In accordance with further aspects of this exemplary embodiment, the next index of a last cloned entry in a data structure may point to the master entry.

In accordance with other aspects of this exemplary embodiment, the techniques may include determining that the clone entry for the cloned data is an only clone entry, wherein the determination comprises determining that the next index of the cloned entry matches the master index of the cloned entry, determining that the next index of the master entry points to the clone entry, uncloning the clone entry of the cloned data by setting the next index of the clone entry to a indirection entry indicating a packed logical block and setting the master index entry to a indirection entry indicating a packed logical block, and uncloning the master entry of the cloned data by setting the next index of the master entry to a first indirection entry indicating a first packed logical block of an original master entry and setting the master index of the master entry to second indirection entry indicating second packed logical block of the original master entry.

In accordance with additional aspects of this exemplary embodiment, the techniques may include determining that the clone entry for the cloned data is one of a plurality of clone entries, wherein the determination comprises determining at least one of: that the next index of the cloned entry does not match the master index of the cloned entry, and that the next index of the master entry does not point to the clone entry, and uncloning the clone entry of the cloned data by setting the next index of a prior entry to point to an entry indicated by the next index of the clone entry.

In accordance with further aspects of this exemplary embodiment, the techniques may include reviewing an entry during a garbage collection process, determining that the entry contains a cloned indicator, and determining that the entry in the garbage collection process is a valid entry not to be deleted based upon the determination that the entry contains the cloned indicator.

In other embodiments, the techniques may be realized as a computer program product comprised of a series of instructions executable on a computer. The computer program product may perform a process for providing improved copy on write functionality within an SSD. The computer program may implement the steps of providing, in memory of a device, an indirection data structure comprising a master entry for cloned data, the master entry having a reference to one or more indexes, a clone entry for the cloned data, the cloned entry having at least one of: a reference to a master index, a reference to a next index, and a value indicating an end of a data structure, and traversing, using a computer processor, one or more copies of the cloned data using one or more of the references.

In yet other embodiments, the techniques may be realized as a system for providing improved copy on write functionality within an SSD. The system may include a first device, wherein the first device includes stored instructions stored in memory. The instructions may include an instruction to provide, in memory of the first device, an indirection data structure comprising a master entry for cloned data, the master entry having a reference to one or more indexes, a clone entry for the cloned data, the cloned entry having at least one of: a reference to a master index, a reference to a next index, and a value indicating an end of a data structure, and traversing, using a computer processor, one or more copies of the cloned data using one or more of the references.

In accordance with additional aspects of this exemplary embodiment, the indirection data structure may include a plurality of physical addresses.

In accordance with further aspects of this exemplary embodiment, the indirection data structure may be part of a circularly linked list, wherein the master entry for cloned data comprises a reference to a master index and a reference to a next index.

In accordance with other aspects of this exemplary embodiment, the indirection data structure may be part of a circularly linked list, wherein the clone entry for the cloned data comprises a reference to the master index and a reference to a next index.

In accordance with additional aspects of this exemplary embodiment, the indirection data structure may be part of a single-ended linked list, wherein an entry in an index provides an indication that the index is a master index.

In accordance with further aspects of this exemplary embodiment, the references may include entries in a flat indirection table for logical block addressing.

In accordance with other aspects of this exemplary embodiment, the first device may include a Peripheral Component Interconnect Express (PCIe) device.

In accordance with additional aspects of this exemplary embodiment, the techniques may further include an instruction to set an indicator for one or more packed logical blocks to indicate that the one or more packed logical blocks are cloned.

In accordance with further aspects of this exemplary embodiment, the master index of the master entry and the master index of the cloned entry may point to the master entry and the next index of a last cloned entry in a data structure points to the master entry.

In accordance with additional aspects of this exemplary embodiment, the target device (e.g., a PCIe device) may include at least one of: a graphics processing unit, an audio/video capture card, a hard disk, a host bus adapter, and a Non-Volatile Memory express (NVMe) controller. According to some embodiments, the target device may be an NVMe compliant device.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 2 depicts a data structure representing uncloned packed logical blocks, in accordance with an embodiment of the present disclosure.

FIG. 6a depicts a data structure of Master C-Chunk data structure entry formats, in accordance with an embodiment of the present disclosure.

FIG. 6B depicts a data structure of Clone C-Chunk data structure entry formats, in accordance with an embodiment of the present disclosure.

DESCRIPTION

Figure 1:
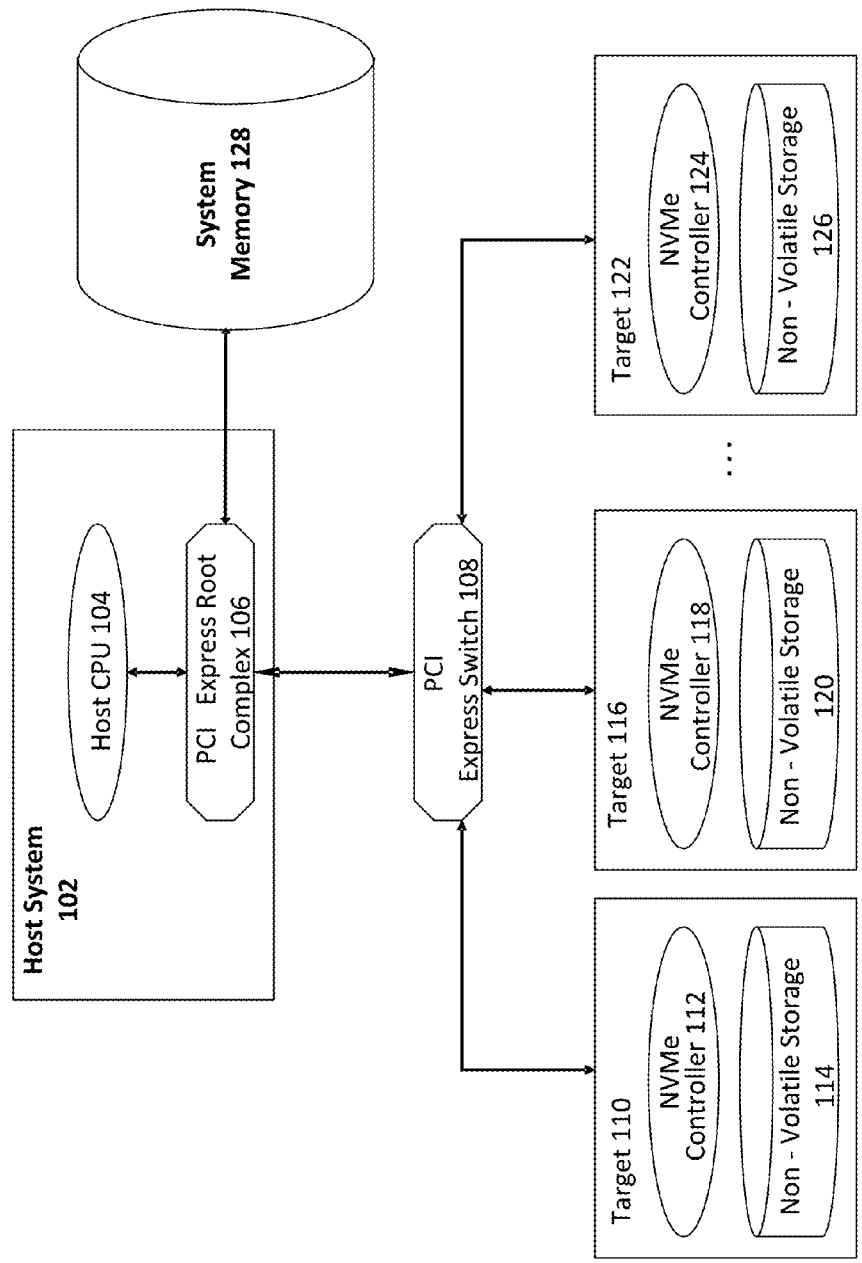
FIG. 1 shows an exemplary block diagram depicting a plurality of PCIe devices in communication with a host device, in accordance with an embodiment of the present disclosure.

The present disclosure relates to improved copy on write functionality. In some embodiments, this copy on write functionality may include namespace copies. The NVMe SSD PCIe host interface defines a concept of Namespaces, which are analogous to logical volumes supported by SAS RAID (Redundant Array of Independent Disks) adapters. A namespace may be dedicated to a Virtual Machine (VM). Within an SSD, Namespaces can be logically isolated from one another and can be securely erased and repurposed without affecting other Namespaces.

A namespace identifier may be included in a media access command issued by the host, along with the LBA within that namespace. The SSD may use a data structure (e.g., a table lookup, a tree, a hashmap, a bitmap, etc.) to translate that combination of namespace and LBA into a global LBA used internally to the SSD. According to some embodiments, references to an LBA may refer to this global LBA.

Embodiments of the present disclosure describe a system and method for implementing an efficient Namespace Copy' function that avoids duplicating the data on the SSD. This reduces the write amplification incurred within the SSD, which extends the life of the SSD while providing higher performance.

Namespace copies are a form of 'copy on write' functionality. On the copy function, a pointer is generated that points to the single copy on the media. A new copy on the media is generated and updated on a write. A Namespace copy function necessitates an efficient implementation of 'copy on write' on an SSD. Embodiments of the present disclosure can be applied to namespace copies. Embodiments of the present disclosure can also be applied to other 'copy on write' implementations for an SSD. For example, a "snapshot" copy may be used to create point-in-time images of a namespace and implementations of the present embodiment may be used to track snapshot copies.

Embodiments of the present disclosure, provide an SSD indirection system (e.g. flat LBA table) or method to include multiple entries that point to the same physical location. Such an implementation may enable efficient garbage collection when multiple references exist. Tracking multiple references or handling multiple pointers (e.g., to NAND flash data) may improve garbage collection. Garbage collection may be performed using metadata on the non-volatile storage (e.g., NAND Flash memory, NOR Flash memory, etc.) that includes the host LBA for the data. The garbage collection algorithm may determine which host sectors are still valid by looking those LBAs up in the indirection data structure (e.g., a table, a tree, a hashmap, a bitmap, etc.) to see if the data structure still points to the physical location. If not, the algorithm frees the block.

One or more embodiments described herein provide efficient representation of a duplicated indirection entry using a single flag and an alternate indirection entry format that tracks one or more duplicated host LBAs. One or more embodiments may use a flat indirection lookup data structure for tracking multiple logical block addresses pointing to a same physical address. Other embodiments may be implemented using a hashmap, a tree, or composition-based system for tracking duplicated LBAs.

Improved copy on write functionality within an SSD techniques are discussed in further detail below.

Turning now to the drawings, FIG. 1 is an exemplary block diagram depicting a PCIe device in communication with a host device, in accordance with an embodiment of the present disclosure. Copy on write functionality improvements may be implemented in one or more computing technologies such as a host system 102, host CPU 104, and PCI express root complex 106. PCI express switch 108 may communicatively couple a plurality of targets (e.g., PCIe devices such as NVMe based targets) such as Targets 110, 116 and 122 to host system 102 via PCI express root complex 106.

Target 110 may contain NVMe controller 112 and non-volatile storage 114. Target 116 may contain NVMe controller 118 and non-volatile storage 120. Target 122 may contain NVMe controller 124 and non-volatile storage 126.

System memory 128 may contain memory based resources accessible to Host System 102 via a memory interface (e.g., double data rate type three synchronous dynamic random access memory (DDR3 SDRAM)). System memory 128 can take any suitable form, such as, but not limited to, a solid-state memory (e.g., flash memory, or solid state device (SSD)), optical memory, and magnetic memory. System memory 128 can be volatile or non-volatile memory. System memory 128 may contain one or more data structures.

According to some embodiments, interfaces standards other than PCIe may be used for one or more portions including, but not limited to, Serial Advanced Technology Attachment (SATA), Advanced Technology Attachment (ATA), Small Computer System Interface (SCSI), PCI-extended (PCI-X), Fibre Channel, Serial Attached SCSI (SAS), Secure Digital (SD), Embedded Multi-Media Card (EMMC), and Universal Flash Storage (UFS).

The host system 102 can take any suitable form, such as, but not limited to, an enterprise server, a database host, a workstation, a personal computer, a mobile phone, a game device, a personal digital assistant (PDA), an email/text messaging device, a digital camera, a digital media (e.g., MP3) player, a GPS navigation device, and a TV system.

The host system 102 and the target device can include additional components, which are not shown in FIG. 1 to simplify the drawing. Also, in some embodiments, not all of the components shown are present. Further, the various controllers, blocks, and interfaces can be implemented in any suitable fashion. For example, a controller can take the form of one or more of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example.

Referring to FIG. 2, a data structure representing uncloned packed logical blocks is illustrated, in accordance with an embodiment of the present disclosure. Eight, 4 kilobyte packed logical block entries are illustrated in this embodiment. These uncloned Packed Logical Blocks (PLBs) may map Logical Block Addresses (LBAs) to a physical address. As depicted LBAs 0-7 may be mapped to Physical Address Block 0, LBAs 7-15 may be mapped to Physical Address Block 1, LBAs 16-23 may be mapped to Physical Address Block 2, LBAs 24-31 may be mapped to Physical Address Block 3, LBAs 32-39 may be mapped to Physical Address Block 4, LBAs 40-47 may be mapped to Physical Address Block 5, LBAs 48-55 may be mapped to Physical Address Block 6, and LBAs 56-63 may be mapped to Physical Address Block 7.

Figure 3:
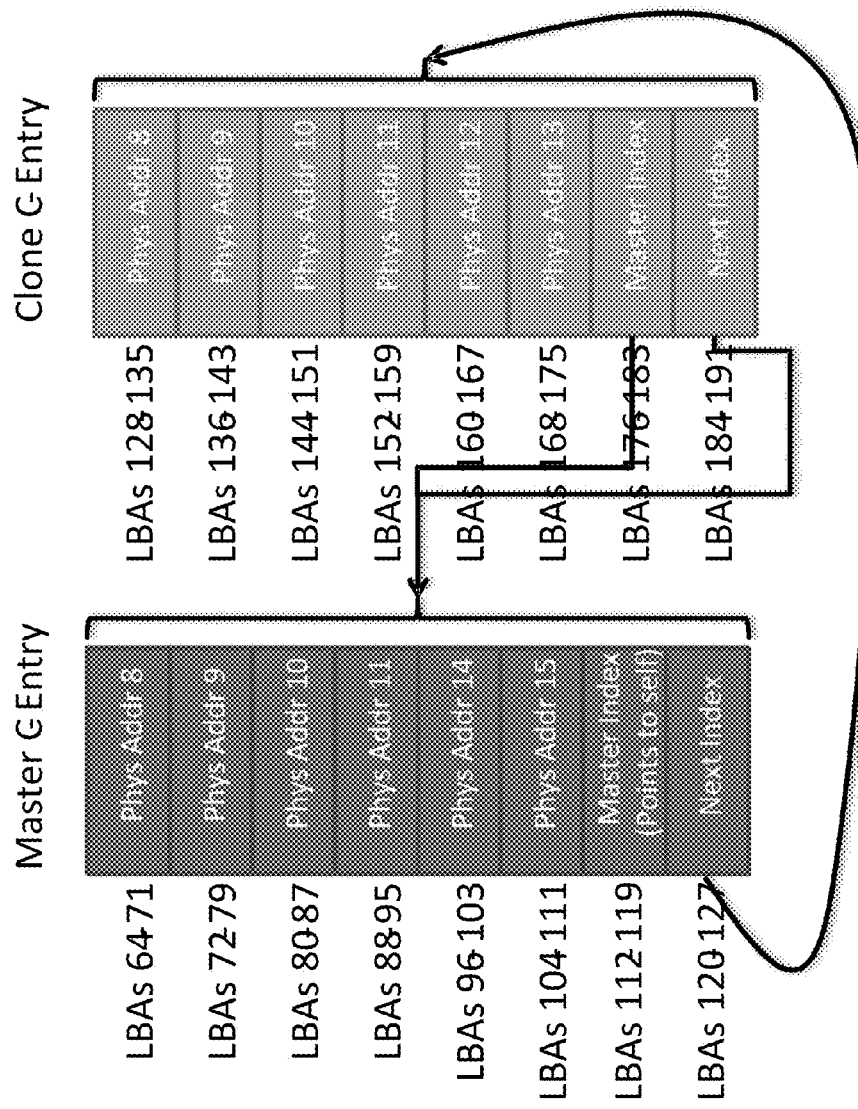
FIG. 3 depicts tables representing master and clone indirection data structure entries, in accordance with an embodiment of the present disclosure.

FIG. 3 depicts tables representing master and clone indirection data structure entries, in accordance with an embodiment of the present disclosure. As described with reference to FIG. 3, in some embodiments, copy-on-write improvements may be implemented in a flat indirection system. A PLB may be a "packed logical block" in a lookup data structure (e.g., a flat indirection lookup table). A set of 8 consecutive 8-PLB-aligned PLBs involved in a cloning operation may be referred to as a "C-Chunk". A C-Chunk whose data on the media is tagged with the PLBs appropriate for that C-Chunk (i.e. the original copy) may be called the "Master C-Chunk". The indirection data structure entries for all PLBs in a C-Chunk may be grouped together to form a single "C-Entry". A C-Entry corresponding to a C-Chunk whose data resides on the media may be called a Master C-Entry. C-Entries which describe LBA ranges that are copies of the Master LBA range may be referred to as Clone C-Entries. One or more SSD's may define a PLB to track 4 KB of customer data plus metadata (e.g. 8×512 B sectors). In embodiments discussed below, a PLB may simply be an entry in a table. An indirection data structure entry may be extended (e.g., by one bit) to facilitate copy-on-write. An extra bit may be a "clone tracking" bit which may be set to 1 to indicate that either there are other PLBs for which this PLB acts as the master copy, or this is a clone that has some other PLB as its master copy. The remaining bits of the indirection data structure entry with the clone tracking bit set may or may not contain a NAND memory address (e.g., like an entry without the bit set may). The alternate data structure for 'clone tracking=1' is tracked at a coarser granularity than the typical PLB entry, and includes fields to create a linked list of cloned entries and a pointer to the master entry. Space for these additional fields may be gained by using a single C-Entry to describe a larger (e.g. 2×) chunk of LBAs than an uncloned indirection entry. This tradeoff is reasonable because cloned data tends to involve large partitions or file sets and not individual host LBAs.

The physical addresses of the individual host LBAs are distributed such that an additional lookup is required for some LBAs. This may make room for including the master and clone pointers in each master and clone entry. The number of DRAM accesses to fetch the physical addresses is not increased significantly, however. As illustrated in FIG. 3, the Master C-Entry may contain LBAs mapped to all physical addresses 8-15, but only contains actual mappings to physical addresses 8-11, 14, and 15 (the mapping to physical addresses 12 and 13 may be obtained from the Clone C-Entry). As illustrated in the Clone C-Entry of FIG. 3, mappings may be provided for LBAs corresponding to physical addresses 8-13. The two physical blocks not mapped in the Master C-entry (Physical Addresses 12 and 13) provide space for a Master Index and a Next Index. The two physical blocks not mapped in the Clone C-entry (Physical Addresses 14 and 15) provide space for a Master Index and a Next Index. A Master Index in a Master C-Entry always points to itself. A Master Index in a Clone C-entry always points to the Master C-Entry. A Next Index of the Master C-Entry points to a first Clone C-Entry in a chain. A Next Index of a Clone C-Entry points to a next Clone C-Entry if there is more than one Clone C-entry. If there is only one Clone C-entry or it is the last Clone C-entry, the Next Index may point back to the Master C-index (or it may point to a special value indicating an end of the list such as, for example, a null pointer). This may allow traversal of a Master C-Entry and one or more Clone C-entries.

In embodiments with a flat indirection data structure, a PLB (physical location block) refers to an individual entry containing a physical NAND memory address in a single lookup table. A typical PLB granularity dedicates 4 KB (e.g. 8*512 B sectors) to a single data structure entry. As an example, consider a clone chunk size of 8 PLBs—the average number of DRAM accesses required for purely random single sector accesses to a cloned range is 1.25. This number can be lower with a larger clone chunk size, with a trade-off being less granular clone boundaries and more NAND accesses required to 'undone' a chunk of PLBs.

If a host read PLB lookup points to a cloned entry, the SSD needs 1) the physical address and 2) the LBA that was used when the data was written. The physical address is distributed between the master and clone entries, optionally filling all available PLB entries with duplicate data to reduce the probability that the targeted LBA requires a second DRAM read. For #2, the master LBA can be calculated based on the master pointer in each clone entry—this does not require an additional DRAM access by design, and this master pointer (along with the next clone pointer) may be cached from the original PLB lookup.

In some embodiments, in order to fit additional information in an existing indirection data structure, cloning may be tracked only at a granularity that is some multiple of the PLB size. In some embodiments, the granularity may be chosen as a power-of-two multiple of the PLB size in order to enable efficient computation of the index of the C-Chunk corresponding to a given LBA. As an example, the multiplier may be 8, but larger cloning granularities may be used. Cloning may involve cloning large ranges of LBAs at a time (such as an entire namespace), so the penalty for using a larger granularity may be minimal.

In some embodiments, the indirection data structure may have embedded in it a circularly linked list of one or more C-Chunks that refer to the same data. In other embodiments, other forms of linked lists (e.g., a single-ended link list) may be used. The physical addresses describing the C-Chunk's data may be spread among indirection entries for that C-Chunk list.

A C-Chunk whose data resides physically on the media, tagged with the PLBs appropriate for that C-Chunk (i.e. the original copy) may be called the "Master C-Chunk". Other C-Chunks that currently refer to the same data without storing a copy on the media may be called "Clone C-Chunks".

The indirection data structure entries for all PLBs in a C-Chunk are grouped together to form a single "C-Entry". For a Master C-Chunk, the C-Entry may be of the format illustrated in FIG. 6A. As illustrated, a Master C-Chunk may contain physical addresses 0-3 (the first four physical addresses in a range), followed by physical addresses 6 and 7. The missing two physical addresses may be mapped in a Clone C-entry and the two extra slots may be used to provide a master index and a next index. As illustrated, a "clone tracking" indicator may be set to 1. This may indicate to a garbage collection process that the C-entry should be ignored.

For a Clone C-Chunk, the C-Entry may be of the format illustrated in FIG. 6B. As illustrated, physical addresses 0-5 may be mapped and physical addresses 6 and 7 may be missing. The missing two physical addresses may be mapped in the Master C-entry and the two extra slots may be used to provide a master index and a next index. As illustrated, a "clone tracking" indicator may be set to 1. This may indicate to a garbage collection process that the G-entry should be ignored.

In one or more embodiments, NAND Address$_i$ may be the NAND address for an $i^{th}$ PLB of the Master C-Chunk (with i=0 representing the first PLB). A Master Index may be an indirection data structure index of the Master C-Entry (divided by 8 since it consumes the space of 8 PLB entries). A Next Index may be an indirection data structure index for the next Clone C-Entry pointing to the same data (divided by 8 since it consumes the space of 8 PLB entries). If there are no more Clone C-Entries to represent, this Next Index may point back to the Master C-Entry. In some embodiments, this Next Index may point to a value indicating termination of the list (e.g., a null pointer).

In some embodiments, one or more tests may be used to determine whether a C-Chunk is a master entry. For example, a C-Chunk may be the master if and only if the Master Index of its C-Entry points to the C-Entry itself.

The relationship between a Master C-Entry and a Clone C-Entry via Master Indexes and Next Indexes may allow one or more of the following operations to be performed efficiently.

To clone a set of 8 consecutive 8-PLB-aligned PLBs one or more methods may be used. For example, in one or more embodiments, cloning a set of PLBs may include:
1. Reading the 8 NAND Addresses for the PLBs of the original copy to refer to when creating the Master and Clone C-Entries;
2. Creating a Master C-Entry in place of the indirection entries of the 8 original PLBs. The Next Index may point to the new Clone C-Entry; and 3. Creating a Clone C-Entry in place of the indirection entries of the 8 PLBs that will now act as a clone. The Next Index may point to the new Master C-Entry.

To clone a C-Chunk into a new C-Chunk one or more methods may be used. For example, in one or more embodiments, cloning a C-Chunk into a new C-Chunk may include:
1. If the source C-Chunk is a master, following a source C-Entry's Next Index to find a clone C-Entry and copy it to the location of the new C-Entry. If the source C-Chunk is not a master, copying the source C-Entry to the location of the new C-Entry;
2. Updating the Next Index of the new C-Entry with the Master C-Entry's current Next Index;
3. Updating the Next Index of the Master C-Entry to point to the new C-Entry.

To do a read lookup on a PLB whose indirection entry has Clone Tracking bit set, one or more methods may be used. For example, in one or more embodiments, performing a read lookup on a PLB with an indirection bit set may include:
1. Looking at the C-Entry that contains this PLB's indirection entry. Determining whether this C-Entry is a Master C-Entry or not. Based on the determination, further determining whether the NAND address for the desired Master PLB is stored in this C-Entry.
2. If the NAND address is stored in the first C-Entry read, that NAND address and the Master Index may be returned. The Master Index can be used to determine what PLB number the data will be tagged with, without performing any additional indirection lookups.
3. If the NAND address is not stored in the first C-Entry read and the first C-entry read is a master C-Entry, the Next Index may be followed to find a Clone C-Entry that contains the NAND address needed. That NAND address and the Master Index may be returned.
4. If the NAND address is not stored in the C-Entry read and it is a clone C-Entry, the Master Index may be followed to find a Master C-Entry that contains the NAND address needed. That NAND address and the Master Index may be returned.

To "undone" a Clone C-Chunk one or more techniques may be used. For example, in some embodiments the techniques may include:
1. Determining if there is only one clone. For example, if the Next Index of the target's C-Entry matches its Master Index and the Master C-Entry's Next Index points to the target C-Entry, then there is only one clone. Read up the C-Entries for both the Master and the Clone and overwrite the Master C-Entry with "normal" indirection entries for those PLBs.
2. If the Next Index of the target's C-Entry does not match its Master Index or the Master C-Entry's Next Index does not points to the target C-Entry, then, there are other clones. Remove this C-Entry from its circular list.
3. In either case, reading the data for the Master C-Chunk and copying it to the Clone C-Chunk, overwriting the Clone C-Entries with normal indirection entries indicating the NAND addresses of the new copy.

To "undone" a Master C-Chunk one or more techniques may be used. For example, in some embodiments the techniques may include:
1. Reading the Master C-Entry and the first Clone C-Entry; and
2. Reading the data from a storage medium for the Master C-Chunk and copying it to the PLB's of first Clone C-Chunk by writing it to a new storage medium location and associating the host LBA metadata with the corresponding Clone C-Chunk;
3. If that first clone is the sole clone (i.e. its Next Index points back to the master), then overwriting the first Clone C-Entry with normal indirection entries pointing to the NAND addresses for the copy we just created. Overwrite the Master C-Entry with normal indirection entries pointing to PLB's of the original master C-Chunk
4. If the first clone was not the sole clone, remove the master from the circularly linked list. Overwrite the first Clone C-Entry with a new Master C-Entry for the copy we just created. Overwrite other Clone C-Entries with a new Clone C-Entry for the copy we just created. This may promote the first clone C-Entry of the old Master C-Entry to become the new Master C-Entry for itself and the remaining clone C-Entries.

When an indirection update is required for a target PLB that has the Clone Tracking bit set, the techniques may include atomically:
1. Uncloning the PLB's C-Chunk; and
2. Performing the indirection update normally.

Garbage Collection may be implemented such that the garbage collection algorithm never discards the data for any physical data whose PLB is marked with the Clone Tracking bit in the indirection system. That is, the garbage collection algorithm may consider all PLBs marked with a clone tracking bit to be "valid" data that requires relocation rather than erasure.

In one or more embodiments, a small counting bloom filter could be stored in SRAM to track C-Chunks present in the system. On a write, if the bloom filter may indicate there's no possibility of the PLB being part of a C-Chunk, then a direct update of the indirection system may safely be performed without reading the current data structure entry first. Because clones tend to be large sequential ranges, the hash function used for a bloom filter may be something like: f(C-Entry Index)=C-Entry Index/Filter Size rather than a random function.

Figure 4:
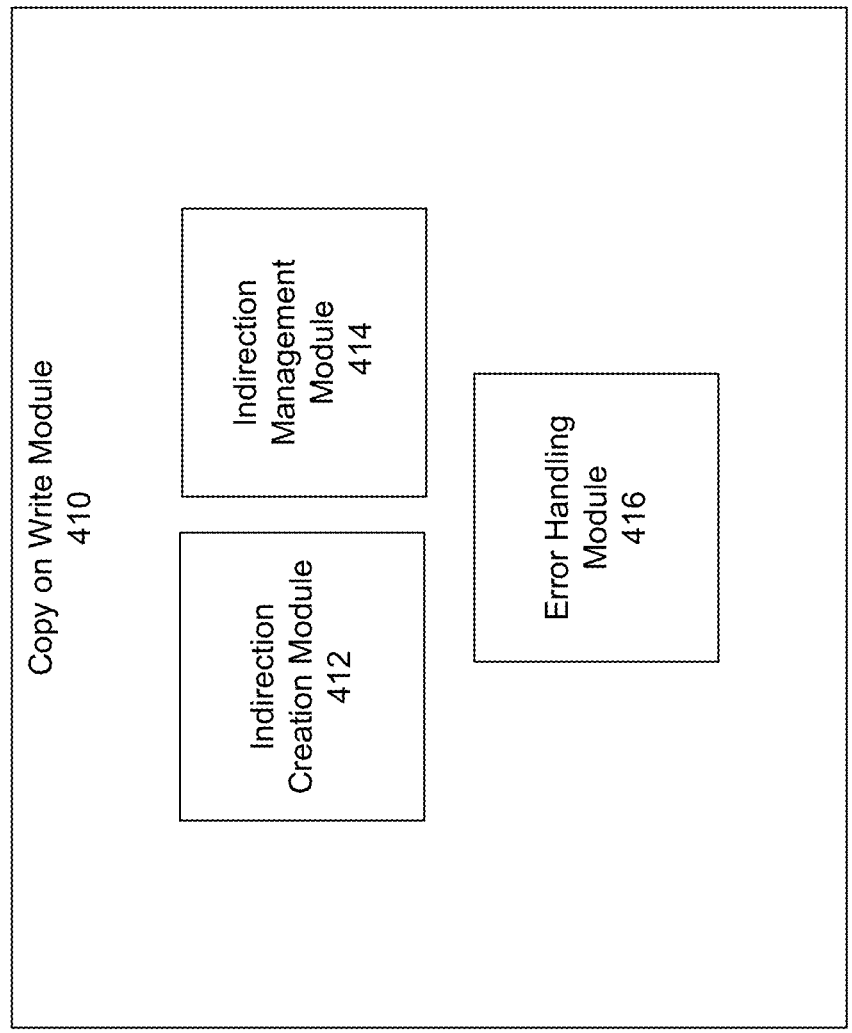
FIG. 4 depicts an exemplary module for improved copy on write functionality within an SSD, in accordance with an embodiment of the present disclosure.

FIG. 4 depicts an exemplary module for improved copy on write functionality within an SSD, in accordance with an embodiment of the present disclosure. As illustrated in FIG. 4, copy on write module 410 may contain indirection creation module 412, indirection management module 414, and error handling module 416.

Indirection creation module 412 may create one or more data structures for tracking copy on write copies. A PLB may simply be an entry in a table. An indirection data structure entry may be extended (e.g., by one bit) to facilitate copy-on-write. An extra bit may be a "clone tracking" bit which may be set to 1 to indicate that either there are other PLBs for which this PLB acts as the master copy, or this is a clone that has some other PLB as its master copy. The remaining bits of the indirection data structure entry with the clone tracking bit set may or may not contain a NAND address (e.g., like an entry without the bit set may). The alternate data structure for 'clone tracking=1' includes fields to create a linked list of cloned entries and a pointer to the master entry. Space for these additional fields is gained by using a single entry to describe a larger (e.g. 2×) chunk of LBAs than an uncloned indirection entry.

Indirection management module 414 may perform one or more operations using an indirection data structure. Indirection management module 414 may facilitate cloning of data, reading of cloned data, uncloning data, and facilitate safe and efficient garbage collection using one or more of the methods as discussed above in reference to FIG. 3.

Error handling module 416 may trap, log, report, and/or handle one or more errors associated with managing cloned data.

Figure 5:
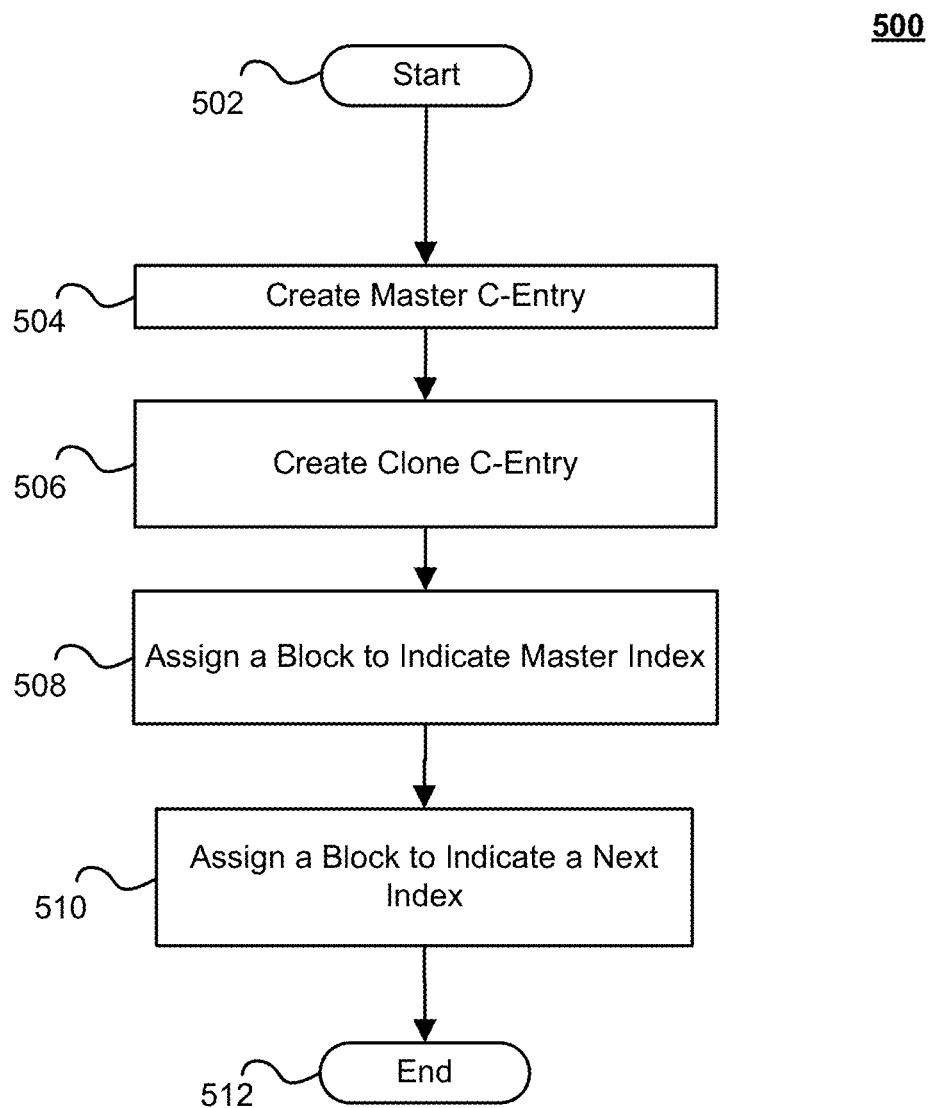
FIG. 5 depicts a flowchart illustrating improved copy on write functionality within an SSD, in accordance with an embodiment of the present disclosure.

FIG. 5 depicts a flowchart illustrating improved copy on write functionality within an SSD, in accordance with an embodiment of the present disclosure. The process 500, however, is exemplary only. The process 500 can be altered, e.g., by having stages added, changed, removed, or rearranged. At stage 502, the process may begin.

At stage 504, a master c-entry may be created. A C-Chunk whose data resides physically on the media, tagged with the PLBs appropriate for that C-Chunk (i.e. the original copy) may be called the "Master C-Chunk". Other C-Chunks that currently refer to the same data without storing a copy on the media may be called "Clone C-Chunks".

The indirection data structure entries for all PLBs in a C-Chunk are grouped together to form a single "C-Entry". For a Master C-Chunk, the C-Entry may be of the format illustrated in FIG. 6A.

At stage 506, a clone c-entry may be created. For a Clone C-Chunk, the C-Entry may be of the format illustrated in FIG. 6B.

In one or more embodiments, NAND Address' may be the NAND address for an $i^{th}$ PLB of the Master C-Chunk (with i=0 representing the first PLB).

At stage 508, a block may be assigned to indicate a master index. A Master Index may be an indirection data structure index of the Master C-Entry (divided by 8 since it consumes the space of 8 PLB entries). Master Indexes of both a Master C-Entry and a Clone C-Entry may point to a Master C-Entry.

At stage 510, a block may be assigned to indicate a next index. A Next Index may be an indirection data structure index for the next Clone C-Entry pointing to the same data (divided by 8 since it consumes the space of 8 PLB entries). If there are no more Clone C-Entries to represent, this Next Index may point back to the Master C-Entry.

In some embodiments, one or more tests may be used to determine whether a C-Chunk is a master entry. For example, a C-Chunk may be the master if and only if the Master Index of its C-Entry points to the C-Entry itself.

At stage 512, the method 500 may end.

Other embodiments are within the scope and spirit of the invention. For example, the functionality described above can be implemented using software, hardware, firmware, hardwiring, or combinations of any of these. One or more computer processors operating in accordance with instructions may implement the functions associated with improved copy on write functionality within an SSD in accordance with the present disclosure as described above. If such is the case, it is within the scope of the present disclosure that such instructions may be stored on one or more non-transitory processor readable storage media (e.g., a magnetic disk or other storage medium). Additionally, modules implementing functions may also be physically located at various positions, including being distributed such that portions of functions are implemented at different physical locations.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method for providing improved copy on write functionality within an SSD comprising:
   providing, in memory of a device, an indirection data structure as part of a circularly linked list, the indirection data structure comprising:
      a master entry for cloned data, the master entry comprising a first plurality of sub-entries, wherein a first sub-entry of the first plurality sub-entries contains a reference to a next index, a second sub-entry of the first plurality of sub-entries contains a reference to a master index, and the remaining sub-entries of the first plurality of sub-entries each contain a packed logical block (PLB);
      a clone entry for the cloned data, the cloned entry comprising a second plurality of sub-entries, wherein a third sub-entry of the second plurality of sub-entries contains a reference to a master index, a fourth sub-entry of the second plurality of sub-entries contains a reference to a next index, and the remaining sub-entries of the second plurality of sub-entries each contain a PLB; and
   traversing, using a computer processor, one or more copies of the cloned data using one or more of the references included in the master entry and/or the clone entry;
   determining that the clone entry for the cloned data is an only clone entry, wherein the determination comprises:
      determining that the reference to the next index of the cloned entry matches the reference to the master index of the cloned entry;
      determining that the reference to the next index of the master entry points to the clone entry;
      uncloning the clone entry of the cloned data by replacing the reference to the next index located in the fourth sub-entry with a PLB, and replacing the reference to the master index located in the third sub-entry with a PLB; and
      uncloning the master entry of the cloned data by replacing the reference to the next index located in the first sub-entry with a PLB, and replacing the reference to the master index located in the second sub-entry with a PLB;
   wherein each PLB comprises a map of logical block addresses (LBAs) to a physical address.

2. The method of claim 1, wherein the references comprise entries in a flat indirection table for logical block addressing.

3. The method of claim 1, wherein the references comprise entries in a tree data structure for logical block addressing.

4. The method of claim 1, further comprising setting an indicator for one or more of the packed logical blocks located in the master entry and the cloned entry to indicate that the one or more packed logical blocks are cloned.

5. The method of claim 1, wherein the reference to the master index of the master entry points to the master entry.

6. The method of claim 1, wherein the reference to the master index of the cloned entry points to the master entry.

7. The method of claim 1, wherein a reference to the next index of a last cloned entry in a data structure points to the master entry.

8. The method of claim 1, further comprising:
reviewing a fifth sub-entry of the indirection data structure during a garbage collection process;
determining that the fifth sub-entry contains a cloned indicator; and
determining that the fifth sub-entry in the garbage collection process is a valid sub-entry not to be deleted based upon the determination that the fifth sub-entry contains the cloned indicator.

9. A computer program product embodied on a non-transitory computer readable medium, comprised of a series of instructions executable on a computer, the computer program product performing a process for providing improved copy on write functionality within an SSD; the computer program implementing the steps of:
providing, in memory of a device, an indirection data structure as part of a circularly linked list, the indirection data structure comprising:
a master entry for cloned data, the master entry comprising a first plurality of sub-entries, wherein a first sub-entry of the first plurality sub-entries contains a reference to a next index, a second sub-entry of the first plurality of sub-entries contains a reference to a master index, and the remaining sub-entries of the first plurality of sub-entries each contain a packed logical block (PLB);
a clone entry for the cloned data, the cloned entry comprising a second plurality of sub-entries, wherein a third sub-entry of the second plurality of sub-entries contains a reference to a master index, a fourth sub-entry of the second plurality of sub-entries contains a reference to a next index, and the remaining sub-entries of the second plurality of sub-entries each contain a PLB; and
traversing, using a computer processor, one or more copies of the cloned data using one or more of the references included in the master entry and/or the clone entry;
determining that the clone entry for the cloned data is an only clone entry, wherein the determination comprises:
determining that the reference to the next index of the cloned entry matches the reference to the master index of the cloned entry;
determining that the reference to the next index of the master entry points to the clone entry;
uncloning the clone entry of the cloned data by replacing the reference to the next index located in the fourth sub-entry with a PLB, and replacing the reference to the master index located in the third sub-entry with a PLB; and
uncloning the master entry of the cloned data by replacing the reference to the next index located in the first sub-entry with a PLB, and replacing the reference to the master index located in the second sub-entry with a PLB;
wherein each PLB comprises a map of logical block addresses (LBAs) to a physical address.

10. A system for providing improved copy on write functionality within an SSD, the system comprising:
a first device;
wherein the first device includes stored instructions stored in memory, the instructions comprising:
an instruction to provide, in memory of the first device, an indirection data structure as part of a circularly linked list, the indirection data structure comprising:
a master entry for cloned data, the master entry comprising a first plurality of sub-entries, wherein a first sub-entry of the first plurality sub-entries contains a reference to a next index, a second sub-entry of the first plurality of sub-entries contains a reference to a master index, and the remaining sub-entries of the first plurality of sub-entries each contain a packed logical block (PLB);
a clone entry for the cloned data, the cloned entry comprising a second plurality of sub-entries, wherein a third sub-entry of the second plurality of sub-entries contains a reference to a master index, a fourth sub-entry of the second plurality of sub-entries contains a reference to a next index, and the remaining sub-entries of the second plurality of sub-entries each contain a PLB; and
traversing, using a computer processor, one or more copies of the cloned data using one or more of the references included in the master entry and/or the clone entry;
determining that the clone entry for the cloned data is an only clone entry, wherein the determination comprises:
determining that the reference to the next index of the cloned entry matches the reference to the master index of the cloned entry;
determining that the reference to the next index of the master entry points to the clone entry;
uncloning the clone entry of the cloned data by replacing the reference to the next index located in the fourth sub-entry with a PLB, and replacing the reference to the master index located in the third sub-entry with a PLB; and
uncloning the master entry of the cloned data by replacing the reference to the next index located in the first sub-entry with a PLB, and replacing the reference to the master index located in the second sub-entry with a PLB;
wherein each PLB comprises a map of logical block addresses (LBAs) to a physical address.

11. The system of claim 10, wherein the references comprise entries in a flat indirection table for logical block addressing.

12. The system of claim 10, wherein the first device comprises a Peripheral Component Interconnect Express (PCIe) device.

13. The system of claim 10, further comprising an instruction to set an indicator for one or more of the packed logical blocks located in the master entry and the cloned entry to indicate that the one or more packed logical blocks are cloned.

* * * * *